(12) United States Patent
Rees-Gralton (10) Patent No.: US 12,534,207 B2
(45) Date of Patent: Jan. 27, 2026

(54) SEAT WITH TRAY TABLE

(71) Applicant: SAFRAN SEATS GB LIMITED, Cwmbran (GB)

(72) Inventor: Thomas Rees-Gralton, Cwmbran (GB)

(73) Assignee: SAFRAN SEATS GB LIMITED, Wales (GB)

( * ) Notice: Subject to any disclaimer, the term of this patent is extended or adjusted under 35 U.S.C. 154(b) by 177 days.

(21) Appl. No.: 18/559,738

(22) PCT Filed: May 5, 2022

(86) PCT No.: PCT/GB2022/051143
§ 371 (c)(1),
(2) Date: Nov. 8, 2023

(87) PCT Pub. No.: WO2022/238683
PCT Pub. Date: Nov. 17, 2022

(65) Prior Publication Data
US 2024/0239492 A1 Jul. 18, 2024

(30) Foreign Application Priority Data
May 12, 2021 (GB) .................................. 2106778

(51) Int. Cl.
*B64D 11/06* (2006.01)
(52) U.S. Cl.
CPC ................ *B64D 11/0638* (2014.12)
(58) Field of Classification Search
CPC ........ B60N 3/004; B64D 11/0638; A47C 7/70
USPC ................................................ 297/163, 146
See application file for complete search history.

(56) References Cited

U.S. PATENT DOCUMENTS

| | | | | |
|---|---|---|---|---|
| 1,243,958 A | * | 10/1917 | McFarland | B60R 7/043 |
| | | | | 4/644 |
| 1,781,977 A | * | 11/1930 | Cummings | B60N 3/004 |
| | | | | 297/146 |
| 1,790,468 A | * | 1/1931 | Frank et al. | A47B 5/04 |
| | | | | 108/134 |

(Continued)

FOREIGN PATENT DOCUMENTS

| | | | |
|---|---|---|---|
| DE | 102011011657 A1 | 8/2012 | |
| WO | WO-9109778 A1 * | 7/1991 | B60N 3/001 |

(Continued)

OTHER PUBLICATIONS

Combined Search and Examination Report received for GB Patent Application No. 2106778.0, mailed on Oct. 12, 2021, 7 pages.

(Continued)

*Primary Examiner* — Jose V Chen
(74) *Attorney, Agent, or Firm* — WOMBLE BOND DICKINSON (US) LLP (57) ABSTRACT

A seat including a backrest; and a tray table coupled to the backrest, the tray table being movable between a stowed position in which the tray table lies against the backrest and a deployed position in which the tray table extends away from the backrest; the backrest having a backrest body and a backrest overlap portion, the backrest overlap portion having a fixed orientation relative to the backrest body and overlapping a first portion of the tray table when the tray table is in the stowed position such that the first portion of the tray table is between the backrest overlap portion and the backrest body.

16 Claims, 6 Drawing Sheets

(56) References Cited

U.S. PATENT DOCUMENTS

| | | | | |
|---|---|---|---|---|
| 6,592,179 | B1* | 7/2003 | Miyazaki | G09F 21/049 |
| | | | | 297/146 |
| 7,104,599 | B2* | 9/2006 | Berger | B60N 3/004 |
| | | | | 40/594 |
| 7,287,817 | B2* | 10/2007 | Goldman | B64D 11/0638 |
| | | | | 297/146 |
| 8,091,959 | B2* | 1/2012 | Berger | G09F 21/049 |
| | | | | 40/594 |
| 8,905,470 | B2* | 12/2014 | Shih | B60N 3/004 |
| | | | | 297/146 |
| 2002/0066393 | A1* | 6/2002 | Strode | G09F 21/04 |
| | | | | 108/50.11 |
| 2011/0187163 | A1* | 8/2011 | Westerink | B64D 11/0638 |
| | | | | 29/525.01 |
| 2013/0001987 | A1* | 1/2013 | Heredia | B64D 11/0638 |
| | | | | 297/163 |
| 2015/0028635 | A1* | 1/2015 | Evels | B60N 3/004 |
| | | | | 297/163 |
| 2016/0039349 | A1* | 2/2016 | Casagrande | G06F 1/166 |
| | | | | 156/227 |
| 2016/0143435 | A1* | 5/2016 | Kim | B60N 3/004 |
| | | | | 248/447.1 |
| 2016/0355263 | A1* | 12/2016 | Pozzi | B64D 11/00152 |
| 2017/0283067 | A1 | 10/2017 | Darbyshire et al. | |
| 2018/0229848 | A1* | 8/2018 | Murray | B60N 3/004 |
| 2021/0347486 | A1* | 11/2021 | Arroum | B60N 3/004 |

FOREIGN PATENT DOCUMENTS

| | | |
|---|---|---|
| WO | 2012/110221 A1 | 8/2012 |
| WO | 2016/089759 A1 | 6/2016 |
| WO | 2016/197104 A1 | 12/2016 |
| WO | 2017/034624 A1 | 3/2017 |
| WO | 2020/089423 A1 | 5/2020 |
| WO | 2020/263262 A1 | 12/2020 |

OTHER PUBLICATIONS

International Search Report and Written Opinion received for PCT Patent Application No. PCT/GB2022/051143, mailed on Jul. 15, 2022, 12 pages.

* cited by examiner

SEAT WITH TRAY TABLE

BACKGROUND

In vehicles such as buses, trains and aeroplanes, is it convenient to incorporate a tray table within the back of a seat so that a passenger seated in a seat behind may use the tray table for eating or working. However, there is a risk that, in the case of an accident, the passenger may collide with the tray table in front of them, which may cause injury. For this reason, the tray tables may be moveable such that they may be stowed in an upright position parallel with the backrest and may be deployed in a level position, which may be horizontal or may be inclined or declined in order to compensate for an angle of the vehicle, such as a flight angle of an aircraft.

When the tray table is in the stowed position, it should not provide any danger to the passenger in the case of a sudden deceleration of the vehicle, such as in a collision. However, the present inventors have realised that, in the case that a seat deforms, such as due to an impact from the head of the passenger seated in the seat behind, the tray table may present an edge or surface upon which the passenger's head may impact and stop. Consequently, the passenger may suffer neck injuries due to the movement of their torso relative to the decelerating vehicle, while their head is stationary relative to the decelerating vehicle, due to engagement with the backrest or with the tray table thereof.

The present inventors have therefore sought to provide a seat and tray table arrangement having a lower risk of injury to a passenger.

SUMMARY OF THE INVENTION

According to a first aspect of the invention, there is provided a seat comprising: a backrest; and a tray table coupled to the backrest, the tray table being movable between a stowed position in which the tray table lies against the backrest and a deployed position in which the tray table extends away from the backrest; the backrest comprising a backrest body and a backrest overlap portion, the backrest overlap portion having a fixed orientation relative to the backrest body and overlapping a first portion of the tray table when the tray table is in the stowed position such that the first portion of the tray table is between the backrest overlap portion and the backrest body.

With such an arrangement, the backrest overlap portion may secure the tray table to the backrest with improved structural integrity compared to existing seat and tray table configurations. Consequently, when the seat deforms, the prospect of an edge or surface of the tray table providing a dangerous impact point for a passenger may be reduced.

The backrest overlap portion and the backrest body may define a recess for receiving the first portion of the tray table. The recess may have an opening around approximately one quarter of its circumference, optionally equal to or less than one quarter. The recess may be substantially square or rectangular in cross section and three of the sides may be solid, while the fourth side is open to receive the tray table. The opening of the recess may therefore be sufficiently small that the tray table may be maintained in place during deformation of the seat.

The tray table may have a width, and the backrest overlap portion may overlap the table proximal to two width-wise extremities of the tray table. The width-wise extremities may also be referred to as side edges or vertical edges of the tray table in the stowed position. Generally, the backrest overlap portion may overlap the tray table in two areas which are spaced apart in a width-wise direction, which is a horizontal direction perpendicular to the direction in which the seat faces. This may inhibit pivoting of the table about a vertical axis relative to the backrest, reducing the prominence of impact points on the tray table for interacting with a head of a passenger. The portions of the backrest overlap portion overlapping the two spaced-apart areas may be joined such that the backrest overlap portion is a single integral part spanning a width of the tray table.

The backrest overlap portion may overlap the tray table over the entire width of the tray table. This may further reduce the prospect of an edge of the tray table being exposed and providing an impact point for engaging the head of the passenger.

The seat may further comprise a latch arranged to selectively maintain the tray table in the stowed position. The latch may thereby prevent inadvertent deployment of the tray table and may keep the tray table secured in the stowed position in the case of an accident.

The backrest overlap portion may cover an upper portion of the tray table, optionally an upper edge of the tray table. This may be particularly advantageous as the motion of a passenger's head may be to pivot about the passenger's waist and may therefore strike the backrest in a downward direction. Protecting the upper portion of the tray table may therefore be particularly advantageous in inhibiting the development of potential impact points.

The latch may be arranged to prevent downward movement of the first portion of the tray table from a stowed position. In this arrangement, a recess in which the first portion of the tray table sits when the tray table in the stowed position may face downwardly and the latch may prevent such downward movement. In this way, the latch may keep the tray table within the recess and may keep the first portion of tray table covered by the backrest overlap portion.

The latch may be arranged to prevent downward movement of the first portion of the tray table from the stowed position. This may keep the tray table covered by the backrest overlap portion.

The latch may be arranged to engage a second portion of the tray table, which may be a lower portion or lower edge of the tray table, and may be arranged to prevent movement of the second portion of the tray table away from the backrest structure when the tray table is in the stowed position. With such an arrangement, the latch may further reduce the prospect of the tray table moving away from the backrest in order to provide a dangerous impact point in the case of deformation of the backrest.

The backrest overlap portion may be formed with a metal, carbon fibre reinforced plastic or glass fibre reinforced plastic. Generally, the backrest overlap portion may be a structural part of the seat having sufficient strength to prevent movement of the tray table away from the backrest in the case of deformation of the seat. The backrest overlap portion and the backrest body may be integrally formed and may be formed of the same material, forming a single rigid body. This may be advantageous over arrangements where the backrest overlap portion is merely aesthetic or is a weak plastic, which may break in the case of an impact to the backrest from the passenger.

The first portion of the tray table may be tapered. This may make it easier for a passenger to move the tray table from a deployed position to a stowed position, as the tapered portion may guide the tray table underneath the backrest overlap portion and into the recess formed by the backrest body and backrest overlap portion.

The seat may further comprise a pivot arm, and the tray table may be supported via the pivot arm. The pivot arm may be arranged to allow downward movement of the first portion of the tray table from the stowed position such that the first portion of the tray table may attain an intermediate position between the stowed position and the deployed position where the first portion is not between the overlap portion and the backrest structure. The pivot arm may be pivotably fixed to a seat, to the backrest, or to a different part of a vehicle within which the seat is located. Generally, the pivot arm may be pivotable about a fixed point such that the portion of the tray table coupled to the pivot arm is moveable away from the backrest structure. The fixed point may be fixed relative to the seat or fixed relative to a vehicle within which the seat is fixed.

The backrest body may have a void arranged to receive the entire tray table. The tray table may therefore not extend or protrude backwardly from the backrest structure when in the stowed position. This may provide a smoother backrest, reducing the number of potential impact points for a passenger, allowing a passenger's head contacting the backrest to slide downwardly along the backrest substantially unimpeded.

The backrest overlap portion may be fixed to the backrest body via a connecting portion arranged above the tray table. The connecting portion may have an angled upper surface, the angled upper surface being higher proximal the backrest body and lower distal from the backrest body. The angled upper surface may provide a lower normal reaction force than a horizontal upper surface when contacted by a downwardly-travelling head of a passenger and may guide the head of a passenger impacting the seat past the upper edge of the tray table, reducing the impact force on the head and neck of the passenger.

According to a second aspect of the invention, there is provided an aircraft having a seat according to the first aspect.

The seat may face the direction of travel of the aircraft and the aircraft may comprise a plurality of seats according to the first aspect, the seats being arranged facing in the same direction, one behind the other. It will be understood that the seats may deviate slightly from the direction of travel of the aircraft, such as to fit within a tapered fuselage, and may generally face the direction of travel to within an accuracy of 10°.

DETAILED DESCRIPTION

Figure 1:
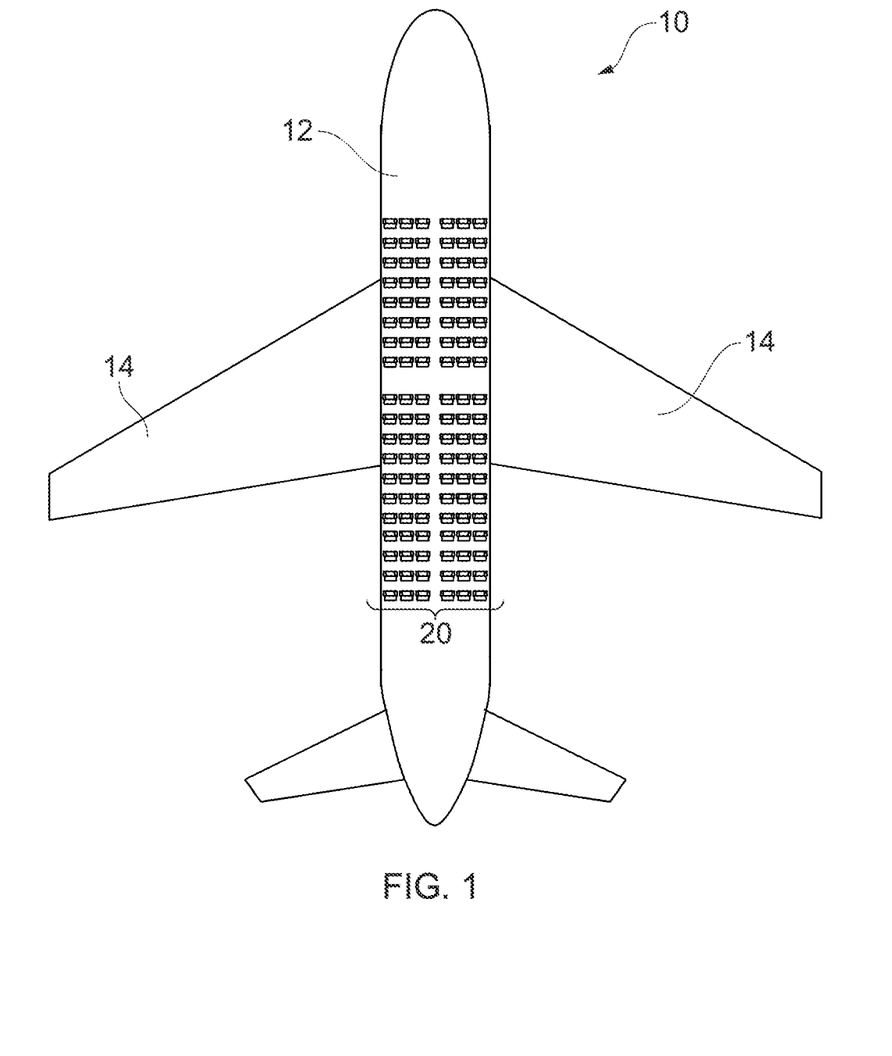
FIG. 1 is a schematic plan view of an aircraft.

FIG. 1 shows a schematic plan view of an aircraft 10. The aircraft 10 has a fuselage 12 and wings 14 extending from the fuselage 12. Within the fuselage 12 there is a seating area 20 having multiple seats for accommodating passengers during flight. The seats face the direction of travel of the aeroplane, which in FIG. 1 is upward, and the seats are arranged in a grid such that most seats have other seats in front of them. It will be understood that the seats may be arranged alternatively, but in most cases the seats will be arranged facing the same direction such that the backrest of one seat is arranged in front of the face of a passenger seated behind.

Figures 2A, 2B:
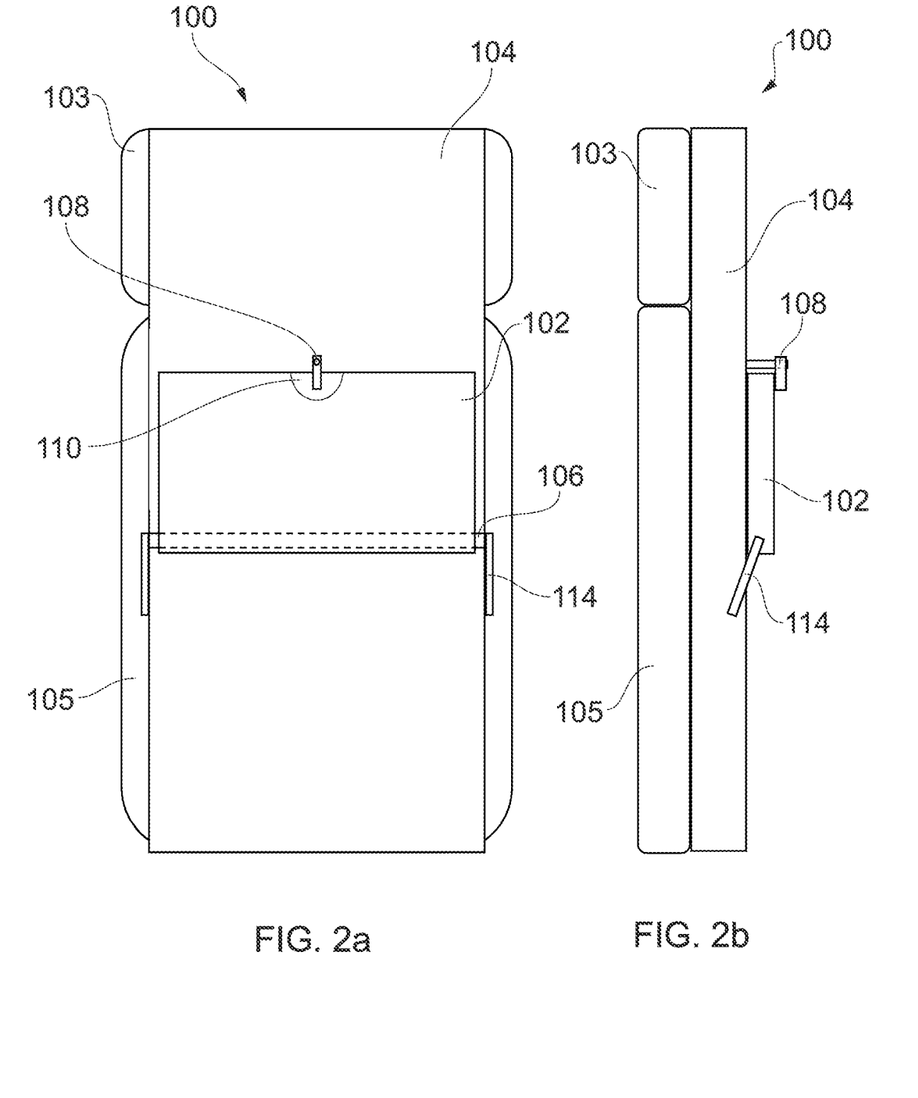
FIGS. 2a and 2b are schematic views of a known seat.

A seat 100 is shown in a rear view in FIG. 2a. This figure substantially represents the view with which a passenger seated behind the seat 100 would be faced. The seat 100 is also shown in a side view in FIG. 2b.

The seat 100 has a backrest structure 104, also known as a backrest body, which supports a head rest cushion 103 and a back or lumbar cushion 105. It will be understood that the headrest and back cushions 103, 105 face forwardly to support a passenger seated within the seat 100 and that the seat 100 may also comprise a lower portion or squab arranged to support the posterior of the passenger (not shown), arranged forwardly of the backrest structure 104.

The seat 100 also has a tray table 102. The tray table 102 is shown in a stowed position, as the tray table may be arranged when it is not required by a passenger behind the seat 100, and in particular the tray table 102 may be arranged in the stowed position during take-off and landing so that, in the case of a sudden deceleration of the aircraft, such as due to a collision, the risk of a passenger impacting the tray table 102 and suffering injury may be reduced.

The tray table 102 is supported on a bar 106, which connects the tray table 102 to a pivot arm 114. However, the tray table and pivot arm may alternatively be engaged by a protrusion from one being received in a recess of another or the pivot arm may connect to embedded blocks sandwiched within the table leaf. In FIGS. 2a and 2b, it is shown that the pivot arm 114 is supported on the backrest structure 104. However, it will be understood that the pivot arm 114 may be attached to the structure of the aircraft or to a lower portion of the seat 100 which is not shown.

The seat 100 also has a latch 108, which is arranged to maintain the tray table 102 in the stowed position by engagement with a first portion 110 of the tray table 102. The latch 108 may be rotated about an axis perpendicular to the backrest structure 104 in order to release the tray table 102 so that it may be moved from the stowed position into a deployed position.

Since the top of the tray table 102 is coupled to the backrest structure 104 only at a single, central point (i.e. the latch 108), if the backrest structure 104 deforms, such as due to impact from the head of a passenger, the tray table 102 may move away from the backrest structure, by twisting about a vertical axis through the latch 108, and may thereby present impact points, which may cause injury to the passenger. This effect may also be exacerbated by the nature of the latch 108, which may be structurally weak.

Figure 3A:
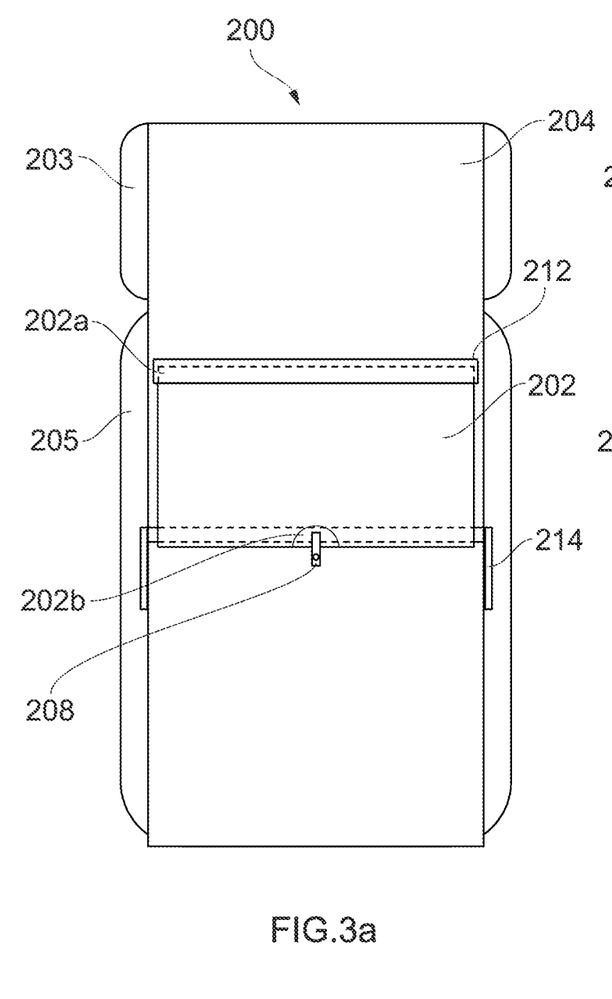
FIGS. 3a and 3b are schematic views of a first seat according to the invention.

FIG. 3a shows a first seat 200 according to an embodiment of the present invention. The seat 200 has a backrest structure, or backrest body, 204 and headrest and backrest cushions 203, 205 which are substantially similar to the equivalent parts of the seat 100 shown in FIGS. 2a and 2b. However, the seat 200 has a tray table 202, which is arranged such that a backrest overlap portion 212 overlaps a top edge of the tray table 202, which may also be considered as a first portion 202a, when the tray table 202 is in the stowed position.

Similarly to the seat 100 of FIGS. 2a and 2b, the tray table 202 is supported on a pivot arm 214 via a bar extending through the tray table 202 and the pivot arm 214 may be mounted on the backrest structure 204 or may be mounted elsewhere, such as on a floor of the aircraft or on a lower portion of the seat 200. However, the range of motion of the tray table 202 relative to the pivot arm 214 may be greater than for the equivalent parts of the seat 100. In particular, the tray table 202 may rotate, from the stowed position, relative to the pivot arm 214 such that the top of the tray table 202 may move towards the backrest structure 204 and the bottom of the tray table 202 may move away from the backrest structure 204. From the position shown in FIG. 3b, this may be an anti-clockwise rotation of the tray table 202.

Figure 3B:
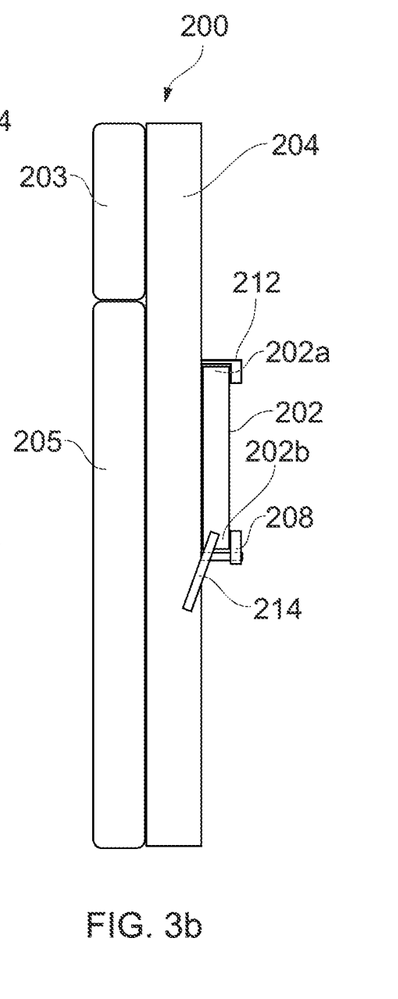

The first portion 202a of the tray table 202 is arranged between the backrest overlap portion 212 and the backrest structure 204 such that the first portion 202a of the tray table 202 cannot move horizontally away from the backrest structure 204 due to being retained by the backrest overlap portion 212. In this way, as can be seen in FIG. 3b, the backrest overlap portion 212 and the backrest structure 204 form a recess into which the first portion 202a and the first edge of the tray table 202 are received when the tray table 202 is in the stowed position.

The backrest overlap portion 212 therefore overlaps the first portion 202a of the tray table 202 in a horizontal direction.

A latch 208, which may be substantially similar to the latch 108 of FIGS. 2a and 2b, although mirrored vertically, may be arranged at a bottom end of the tray table 202 and may be arranged to engage a second portion 202b of the tray table 202.

The latch 208 may be arranged to prevent movement of the bottom edge of the tray table 202 away from the backrest structure 204 (i.e. to prevent the above-described rotation of the tray table 202 relative to the pivot arm 214) or may be arranged to prevent vertical downward movement of the tray table 202. In this way, the latch 208 may retain the tray table 202 in the stowed position and may prevent the first portion 202a of the tray table 202 from leaving the recess defined by the backrest overlap portion 212 and the backrest structure 204. The latch 208 may also be rotatable or otherwise moveable to allow the second portion 202b of the tray table 202 to move selectively, such that the tray table 202 may leave the stowed position depending on the position of the latch 208.

Figure 4A:
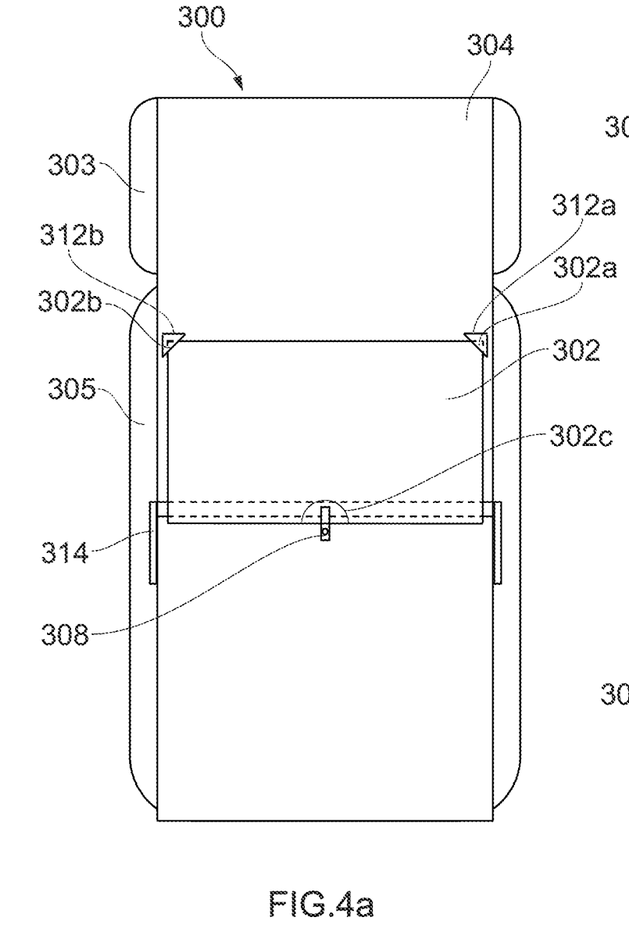
FIGS. 4a and 4b are schematic views of a second seat according to the invention.
Figure 4B:
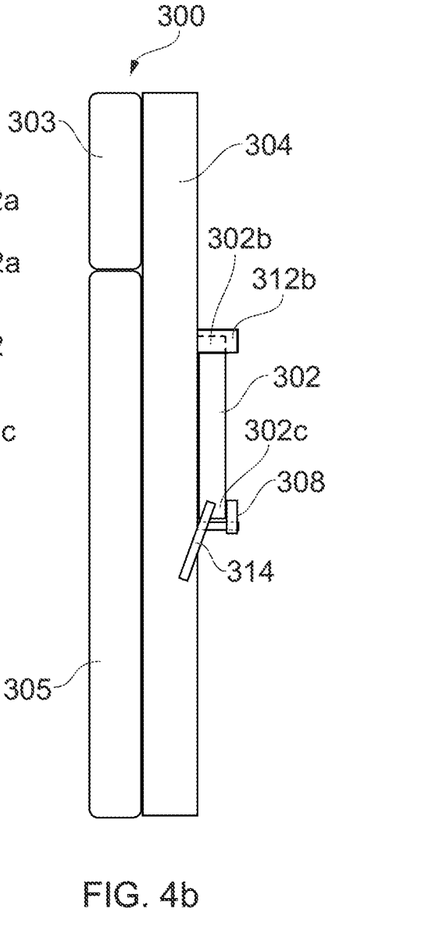

FIGS. 4a and 4b show a second seat 300. The backrest structure 304, headrest cushion 303 and back cushion 305 may be substantially similar to those previously described and the latch 308, second portion 302c of the tray table and pivot arm 314 may be substantially similar to the equivalent features described above with reference to FIGS. 3a and 3b.

The first seat 200 and the second seat 300 may differ in the nature of the backrest overlap portions. While the backrest overlap portion 212 of FIGS. 3a and 3b extends over the entire width of the top edge of the tray table 202 such that the entire top edge is covered by the backrest overlap portion 212, the second seat 300 has two backrest overlap portions 312a, 312b, which are arranged at corners of the tray table 302 and which overlap two separate first portions 302a, 302b of the tray table 302. In this arrangement, the seat 300 may be lighter as the backrest overlap portion may be smaller, and the two backrest overlap portions 312a, 312b may prevent pivoting of the tray table 302 about a vertical axis relative to the backrest structure 304 due to the two backrest overlap portions 312a, 312b being spaced apart in a width-wise direction, which is a horizontal direction perpendicular to the direction the seat faces, and in this case perpendicular to the direction of travel of the aircraft.

While the arrangement of FIGS. 3a and 3b may be advantageous as the entire top edge of the tray table 202 may be covered and so may not present an impact point for a downwardly moving passenger's head, the arrangement shown in FIGS. 4a and 4b may be advantageous as it may provide a lighter seat while inhibiting movement of the tray table 302 away from the backrest structure 304 during deformation of the seat 300.

Figure 5A:
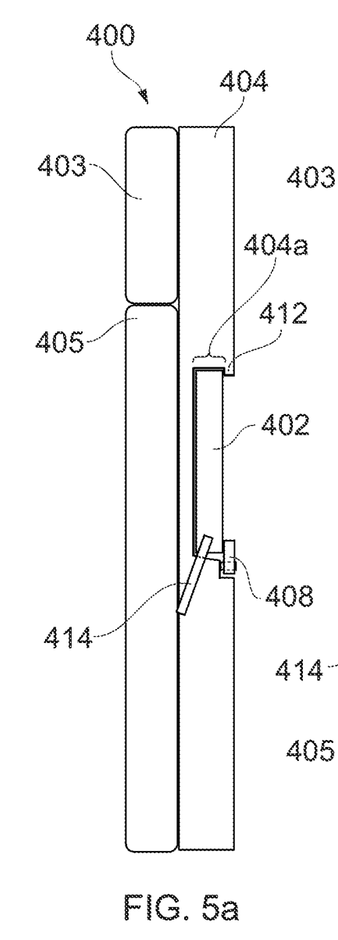
FIGS. 5a, 5b and 5c are schematic views of a third seat according to the invention, where the tray table is transitioning between a stowed position and a deployed position via an intermediate position.
Figures 5B, 5C:
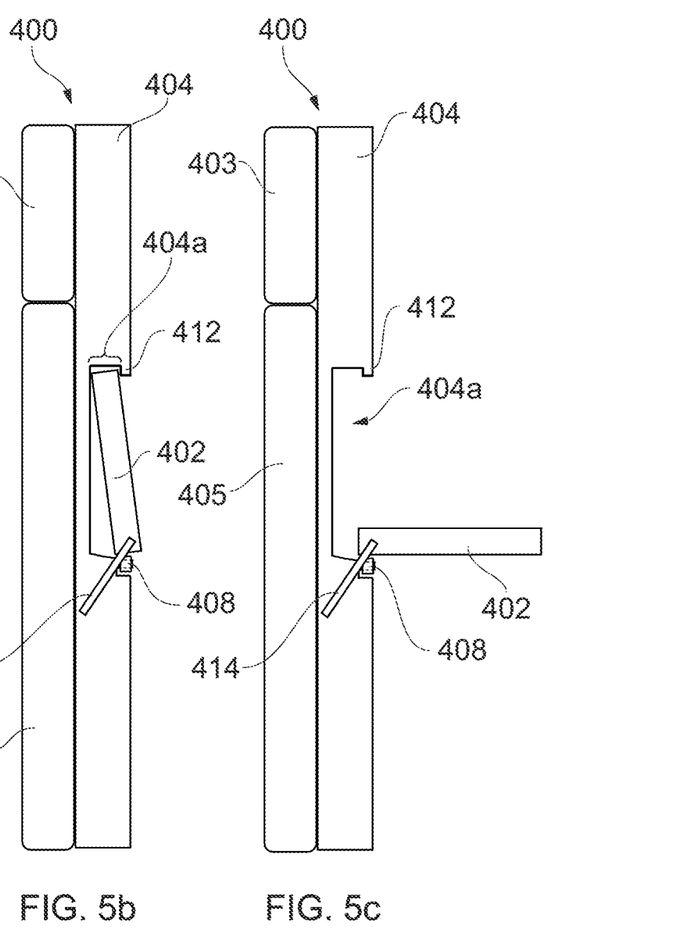

FIGS. 5a to 5c show a third seat 400. The seat 400 has a backrest structure 404 with headrest and backrest cushions 403, 405 which may be substantially similar to those described above. However, the backrest structure 404 may comprise a void 404a, which may be arranged to receive the entirety of the tray table 402, such that none of the tray table 402 protrudes rearwardly of the backrest structure 404 and the entire tray table 402 is overlapped vertically by the backrest structure 404. In this way, the tray table 402 and backrest structure 404 may present a smoother surface and may reduce the number of potential impact points for a passenger's head impacting the backrest structure 404 and sliding downwardly along it.

The FIGS. 5a to 5c also show how a tray table 402 may transition from a stowed position (shown in FIG. 5a) to a deployed position (shown in FIG. 5c) via an intermediate position (shown in FIG. 5b).

The latch 408, which may be arranged to prevent horizontal movement of a lower end of the tray table 402 may be rotated in order to release the lower end of the tray table 402 and the tray table may therefore move such that the lower end is further from the backrest structure 404. As well as the horizontal movement of the bottom end of the table, the tray table 402 may rotate as described above such that the top end of the tray table 402 may move toward the backrest structure 4040 and downwardly and may thereby leave the recess formed by the backrest overlap portion 412 and the backrest structure 404, attaining an intermediate position as shown in FIG. 5b.

The tray table 202 may then be moved and rotated to obtain a substantially horizontal, deployed position as shown in FIG. 5c.

Figure 6:
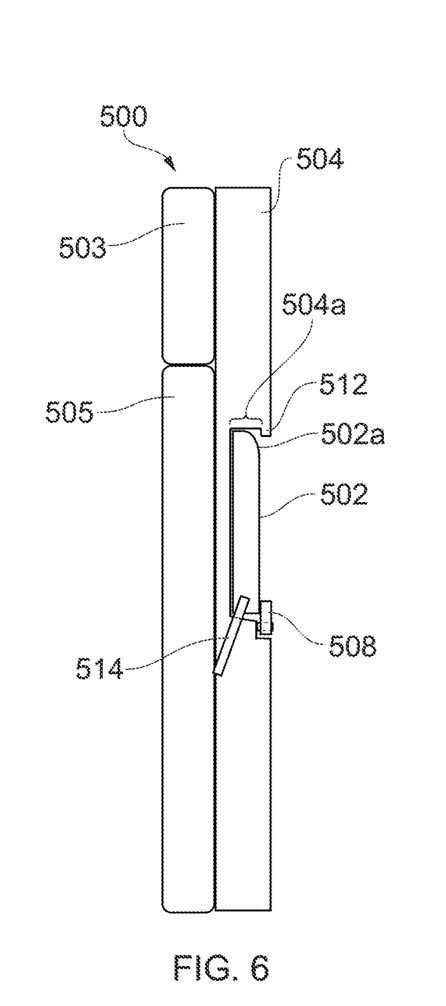
FIG. 6 shows a fourth seat according to the invention.

A fourth seat 500 is shown in FIG. 6, where the tray table 502 has a tapered first portion 502a, which has a reduced width relative to the rest of the tray table 502 and this may make it easier for a passenger to move the tray table 502 into and out from the stowed position. By providing a taper on a side of the tray table 502 opposite the backrest structure 504, the tray table 502 may also interface more comfortably with the lap of a passenger. However, a taper on an opposite side of the tray table 502 may additionally or alternatively be provided and may also assist in the stowage of the tray table 502.

The remaining parts of the seat 500 (i.e. the headrest cushion 503, back cushion 505, backrest structure 504, void 504a, backrest overlap portion 512, pivot arm 514 and latch 508) may be substantially similar to the equivalent parts described above with reference to FIGS. 5a to 5c.

Figure 7:
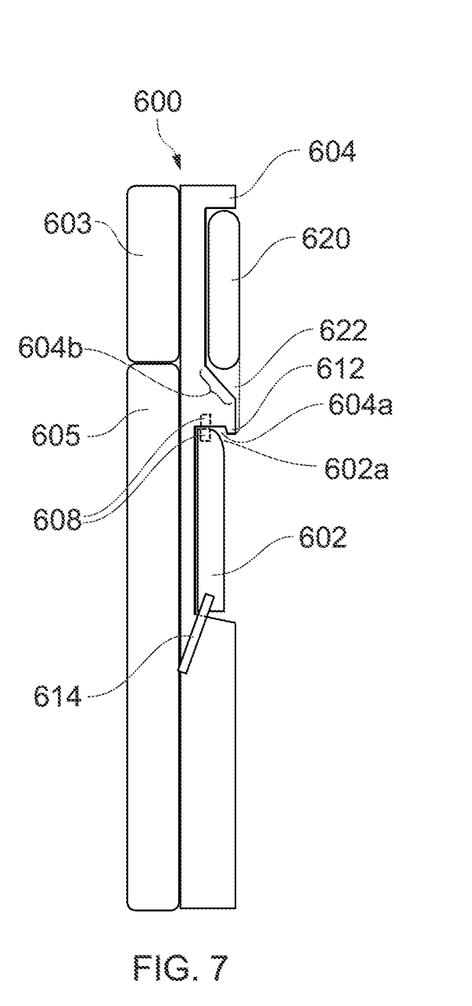
FIG. 7 shows a fifth seat according to the invention.

FIG. 7 shows a fifth seat 600 having a backrest structure 604 incorporating an entertainment screen 620, which may be a television screen. The backrest structure 604 also has a headrest cushion 603 and back cushion 605 similar to the above-described seats. The tray table 602 and pivot arm 614 may also be substantially similar to those described above.

However, the latch may be replaced by an alternative latching mechanism 608, which may, for example, comprise magnets arranged to prevent downward movement of the first portion 602a of the tray table 602 relative to the backrest structure 604 unless the magnetic retaining force is overcome. Alternatively, the latching mechanism 608 may be a catch or other mechanism which may be actuated by a passenger to release the tray table 602.

A further alternative latching mechanism may be a latch arranged to engage with the pivot arms. A moveable latch may selectively engage with the pivot arm, when the tray table is in the stowed position, in order to prevent movement of the pivot arm away from the backrest structure. By retaining the pivot arms in position, the lower portion of the tray table, which is pivotably coupled to the pivot arms, may be fixed in position and thus the tray table may be fixed in position to remain within the recess formed by the overlap portion.

The backrest overlap portion 612 is coupled to the backrest structure 604 via a backrest connecting portion 622. The backrest connecting portion 622 extends over the top of the tray table 602 and may have an angled upper surface 604b, which may be higher at a position closer to the backrest structure 604 and lower distal from the backrest structure 604. Put alternatively, the angled surface 604b may slope upwards in a direction in which the seat is facing, which may also be a direction of travel of the aircraft. The angled surface 604b may therefore act to guide a downwardly moving head of a passenger past the top of the tray table 602 so that the downward movement of the head may be more continuous and the head should not remain stationary for an excessively long period of time.

The invention claimed is:

1. A seat comprising:
    a backrest;
    a tray table coupled to the backrest, the tray table being movable between a stowed position in which the tray table lies against the backrest and a deployed position in which the tray table extends away from the backrest; and
    the backrest comprising a backrest body and a backrest overlap portion, the backrest overlap portion having a fixed orientation relative to the backrest body and overlapping a first portion of the tray table when the tray table is in the stowed position such that the first portion of the tray table is between the backrest overlap portion and the backrest body,
    wherein the tray table is rotatable, from the stowed position, such that the first portion of the tray table moves towards the backrest body relative to an opposite, second portion of the tray table.

2. The seat of claim 1, wherein the backrest overlap portion and the backrest body define a recess for receiving the first portion of the tray table.

3. The seat of claim 1, wherein the tray table has a width, and wherein the backrest overlap portion overlaps the tray table at two locations spaced apart in a widthwise direction.

4. The seat of claim 1, wherein the backrest overlap portion overlaps the tray table over the entire width of the tray table.

5. The seat of claim 1, further comprising a latch arranged to selectively maintain the tray table in the stowed position.

6. The seat of claim 5, wherein the latch is arranged to prevent downward movement of the first portion of the tray table from the stowed position.

7. The seat of claim 5, wherein the latch is arranged to engage with a second portion of the tray table and is arranged to prevent movement of the second portion of the tray table away from the backrest structure.

8. The seat of claim 1, wherein the first portion of the tray table is tapered.

9. The seat of claim 1, further comprising a pivot arm, the tray table being supported via the pivot arm.

10. The seat of claim 9, wherein the pivot arm is pivotally coupled to the backrest structure and is pivotally coupled to the tray table.

11. The seat of claim 9, wherein the pivot arm is pivotable about a fixed point such that the portion of the tray table coupled to the pivot arm is moveable away from the backrest structure.

12. The seat of claim 1, wherein the backrest body has a void arranged to receive the entire tray table.

13. The seat of claim 1, wherein the backrest overlap portion is fixed to the backrest body via a connecting portion arranged above the tray table.

14. The seat of claim 13, wherein the connecting portion has an angled upper surface, the angled upper surface being higher proximal the backrest body and lower distal from the backrest body.

15. An aircraft having a seat, the seat comprising:
    a backrest;
    a tray table coupled to the backrest, the tray table being movable between a stowed position in which the tray table lies against the backrest and a deployed position in which the tray table extends away from the backrest; and
    the backrest comprising a backrest body and a backrest overlap portion, the backrest overlap portion having a fixed orientation relative to the backrest body and overlapping a first portion of the tray table when the tray table is in the stowed position such that the first portion of the tray table is between the backrest overlap portion and the backrest body,
    wherein the tray table is rotatable, from the stowed position, such that the first portion of the tray table moves towards the backrest body relative to an opposite, second portion of the tray table.

16. The seat of claim 1, wherein back rest overlap portion has a fixed position relative to the backrest.

* * * * *